US012682594B2

(12) United States Patent
Mishima

(10) Patent No.: US 12,682,594 B2
(45) Date of Patent: Jul. 14, 2026

(54) IMAGE PROCESSING DEVICE, IMAGE PROCESSING METHOD, AND PROGRAM

(71) Applicant: NEC Corporation, Tokyo (JP)

(72) Inventor: Yoshihiro Mishima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 345 days.

(21) Appl. No.: 18/273,182

(22) PCT Filed: Mar. 30, 2021

(86) PCT No.: PCT/JP2021/013644
§ 371 (c)(1),
(2) Date: Jul. 19, 2023

(87) PCT Pub. No.: WO2022/208685
PCT Pub. Date: Oct. 6, 2022

(65) Prior Publication Data
US 2024/0071034 A1 Feb. 29, 2024

(51) Int. Cl.
*G06K 9/00* (2022.01)
*G06T 5/50* (2006.01)
(Continued)

(52) U.S. Cl.
CPC ................ *G06V 10/26* (2022.01); *G06T 5/50* (2013.01); *G06T 7/70* (2017.01); *G06V 10/22* (2022.01);
(Continued)

(58) Field of Classification Search
CPC ...... G06V 10/26; G06V 10/22; G06V 10/764; G06V 20/588; G06T 7/70; G06T 5/50;
(Continued)

(56) References Cited

U.S. PATENT DOCUMENTS

2009/0129674 A1* 5/2009 Lin ........................... G06T 7/13 382/173
2011/0115896 A1* 5/2011 Doehring ............... H04N 7/183 382/128

FOREIGN PATENT DOCUMENTS

CN 105872413 A 8/2016
EP 3859707 A1 8/2021
(Continued)

OTHER PUBLICATIONS

International Search Report for PCT Application No. PCT/JP2021/013644, mailed on Jun. 1, 2021.
(Continued)

*Primary Examiner* — Avinash Yentrapati
(74) *Attorney, Agent, or Firm* — Sughrue Mion, PLLC

(57) ABSTRACT

Captured images generated by repeated image capture over time by an image capture device provided on a moving body are acquired, and for each pixel in each of said captured images, a probability indicating to which of multiple different area classes, which have been designated regarding multiple targets appearing in the captured images, the pixel belongs is calculated. Among divisional areas obtained by multiply dividing the captured images in a horizontal direction, a divisional area in which a clarity of a prescribed target among the multiple targets is high, where the probability of belonging to the area class of the prescribed target is equal to or higher than a threshold value, is identified. A clear image is generated by combining the divisional areas in which a display clarity regarding the prescribed target in the captured images is high.

14 Claims, 6 Drawing Sheets

(51) Int. Cl.

| | |
|---|---|
| ***G06T 7/70*** | (2017.01) |
| ***G06V 10/22*** | (2022.01) |
| ***G06V 10/26*** | (2022.01) |
| ***G06V 10/764*** | (2022.01) |
| ***G06V 20/56*** | (2022.01) |
| ***G08G 1/04*** | (2006.01) |

(52) U.S. Cl.
CPC .......... *G06V 10/764* (2022.01); *G06V 20/588* (2022.01); *G08G 1/04* (2013.01); *G06T 2207/20212* (2013.01); *G06T 2207/30256* (2013.01)

(58) Field of Classification Search
CPC G06T 2207/20212; G06T 2207/30256; G08G 1/04
See application file for complete search history.

(56) References Cited

FOREIGN PATENT DOCUMENTS

| | | | | |
|---|---|---|---|---|
| JP | 2001-236506 | A | | 8/2001 |
| JP | 2020021121 | A | * | 2/2020 |
| WO | 2020/066303 | A1 | | 4/2020 |

OTHER PUBLICATIONS

Extended European Search Report for EP Application No. 21934855.4, dated on Apr. 12, 2024.

* cited by examiner

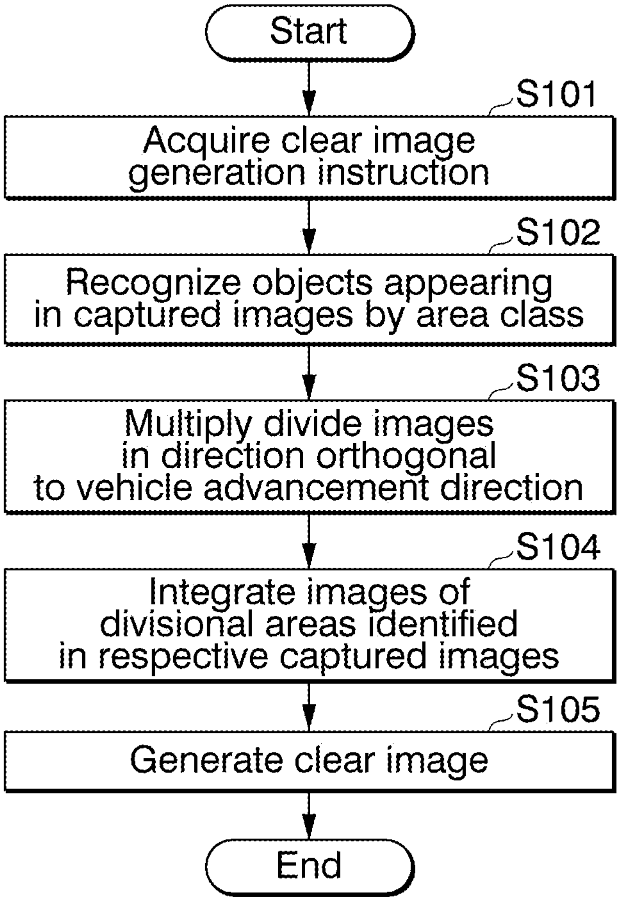

*FIG. 5*

```
                    ┌──────────────┐
                    │    Start     │
                    └──────┬───────┘
                           │          S101
                           ▼
        ┌──────────────────────────────────────┐
        │        Acquire clear image            │
        │       generation instruction          │
        └──────────────────┬───────────────────┘
                           │          S102
                           ▼
        ┌──────────────────────────────────────┐
        │      Recognize objects appearing      │
        │    in captured images by area class   │
        └──────────────────┬───────────────────┘
                           │          S103
                           ▼
        ┌──────────────────────────────────────┐
        │        Multiply divide images         │
        │         in direction orthogonal       │
        │    to vehicle advancement direction   │
        └──────────────────┬───────────────────┘
                           │          S104
                           ▼
        ┌──────────────────────────────────────┐
        │         Integrate images of           │
        │       divisional areas identified     │
        │      in respective captured images    │
        └──────────────────┬───────────────────┘
                           │          S105
                           ▼
        ┌──────────────────────────────────────┐
        │          Generate clear image         │
        └──────────────────┬───────────────────┘
                           │
                           ▼
                    ┌──────────────┐
                    │     End      │
                    └──────────────┘
```

1

Divisional area identifying means    71

Clear image generating means    72

Start

Identify divisional areas with
high clarity of prescribed target    S801

Generate clear image by combining
divisional areas with high clarity    S802

End

IMAGE PROCESSING DEVICE, IMAGE PROCESSING METHOD, AND PROGRAM

This application is a National Stage Entry of PCT/JP2021/013644 filed on Mar. 30, 2021, the contents of all of which are incorporated herein by reference, in their entirety.

TECHNICAL FIELD

Some non-limiting embodiments relates to an image processing device, an image processing method, and a program.

BACKGROUND ART

Vehicle-mounted devices such as drive recorders generate images everyday while vehicles are traveling. Various kinds of analysis can be performed by using such captured images. For example, they are utilized for examination of prescribed targets appearing in the captured images. As one example, if the captured images are images capturing, in the direction of advancement, a road on which a vehicle is traveling, they may be utilized for checking the states of road signs at a later date. A related technology is disclosed in Patent Document 1. Patent Document 1 discloses technology in which road signs are recognized in images to determine vehicle control information utilized to control automated vehicles. When recognizing targets in such images, it is desirable for the images to be clear.

CITATION LIST

Patent Literature

[Patent Document 1] WO 2020/066303

SUMMARY

Problems to be Solved

An image processing technology that can improve the clarity of prescribed targets in an image is sought.

Thus, an objective of the present disclosure is to provide an image processing device, an image processing method, and a program that solve the abovementioned problem.

According to a first aspect of the present, disclosure, an image processing device comprises area recognizing means for acquiring captured images generated by repeated image capture over time by an image capture device provided on a moving body, and for calculating, for each pixel in each of said captured images, a probability indicating to which of multiple different area classes, which have been designated regarding multiple targets appearing in the captured images, the pixel belongs; divisional area identifying means for identifying, among divisional areas obtained by multiply dividing the captured images in a horizontal direction, a divisional area in which a clarity of a prescribed target among the multiple targets is high, where the probability of belonging to the area class of the prescribed target is equal to or higher than a threshold value; and clear image generating means for generating a clear image by combining the divisional areas in which a display clarity regarding the prescribed target in the captured images is high.

According to a second aspect of the present disclosure, an image processing method comprises acquiring captured images generated by repeated image capture over time by an image capture device provided on a moving body, and calculating, for each pixel in each of said captured images, a probability indicating to which of multiple different area classes, which have been designated regarding multiple targets appearing in the captured images, the pixel belongs; identifying, among divisional areas obtained by multiply dividing the captured images in a horizontal direction, a divisional area in which a clarity of a prescribed target among the multiple targets is high, where the probability of belonging to the area class of the prescribed target is equal to or higher than a threshold value; and generating a clear image by combining the divisional areas in which a display clarity regarding the prescribed target in the captured images is high.

According to a third aspect of the present disclosure, a program makes a computer in an image processing device function as area recognizing means for acquiring captured images generated by repeated image capture over time by an image capture device provided on a moving body, and for calculating, for each pixel in each of said captured images, a probability indicating to which of multiple different area classes, which have been designated regarding multiple targets appearing in the captured images, the pixel belongs; divisional area identifying means for identifying, among divisional areas obtained by multiply dividing the captured images in a horizontal direction, a divisional area in which a clarity of a prescribed target among the multiple targets is high, where the probability of belonging to the area class of the prescribed target is equal to or higher than a threshold value; and clear image generating means for generating a clear image by combining the divisional areas in which a display clarity regarding the prescribed target in the captured images is high.

Advantageous Effects of Disclosure

The present disclosure can provide an image processing technology that can improve the clarity of prescribed targets in an image.

BRIEF DESCRIPTION OF THE DRAWINGS

FIG. 5 A diagram indicating the processing flow in the image processing device according to the present embodiment.

EXAMPLE EMBODIMENT

Hereinafter, an image processing device according to an embodiment of the present disclosure will be explained with reference to the drawings.

Figure 1:
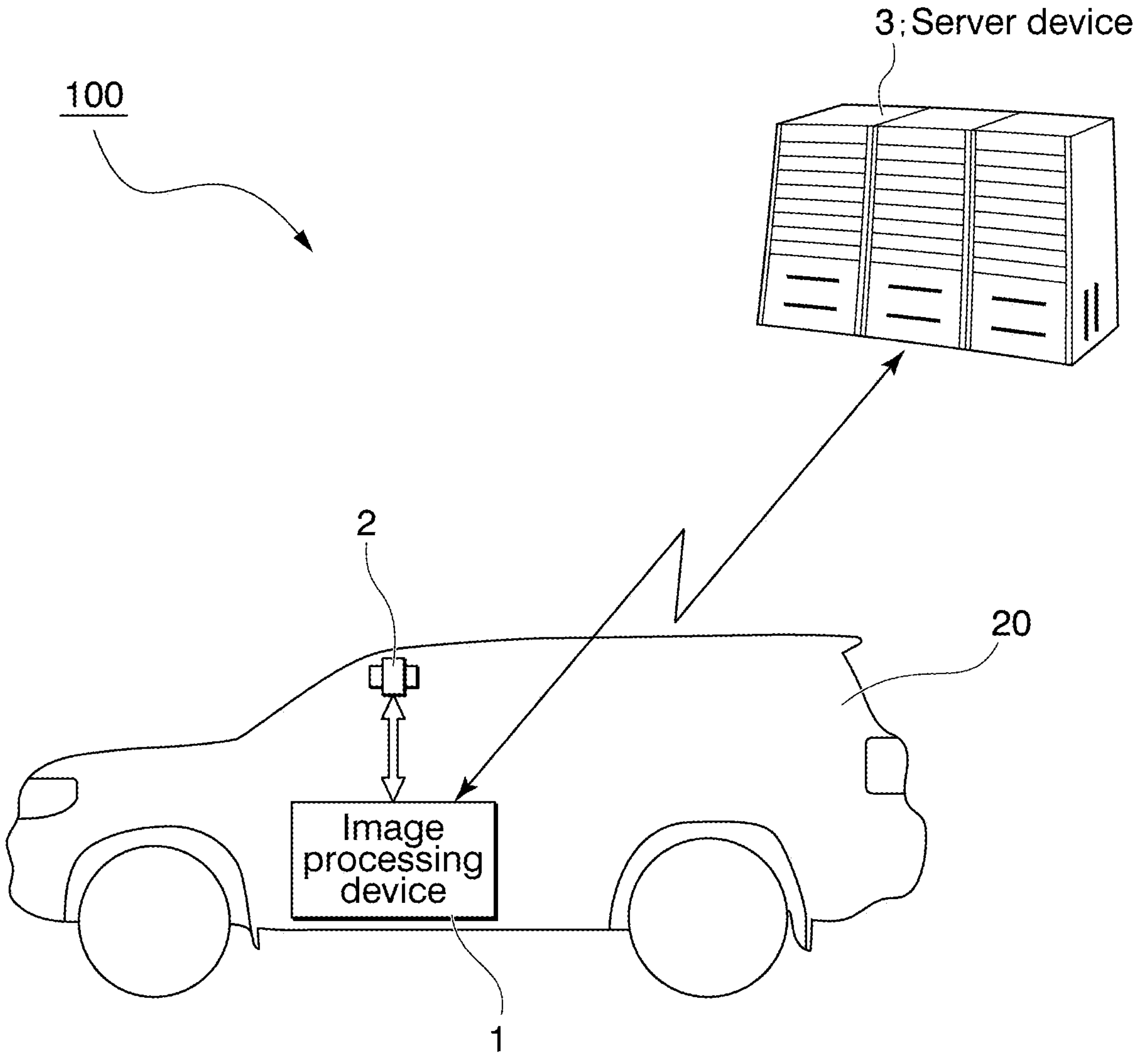
FIG. 1 A diagram illustrating a summary of an image processing system according to the present embodiment.

As illustrated in FIG. 1, the image processing system 100 is constituted by an image processing device 1 and a drive recorder 2, which is mounted on a vehicle 20, being connected by a wireless communication network or a wired communication network. The drive recorder 2 is provided with an image capture function, and in the present embodiment, generates images that may include a road and vehicles traveling ahead on said road. The drive recorder 2 transmits the captured images to the image processing device 1. The image processing device 1 stores the captured images acquired from the drive recorder 2. The image processing device 1 generates, using the captured images sequentially acquired from the drive recorders 2 of multiple vehicles 20, a clear image of a prescribed location. The clear image is an image clearly displaying a prescribed target.

Figure 2:
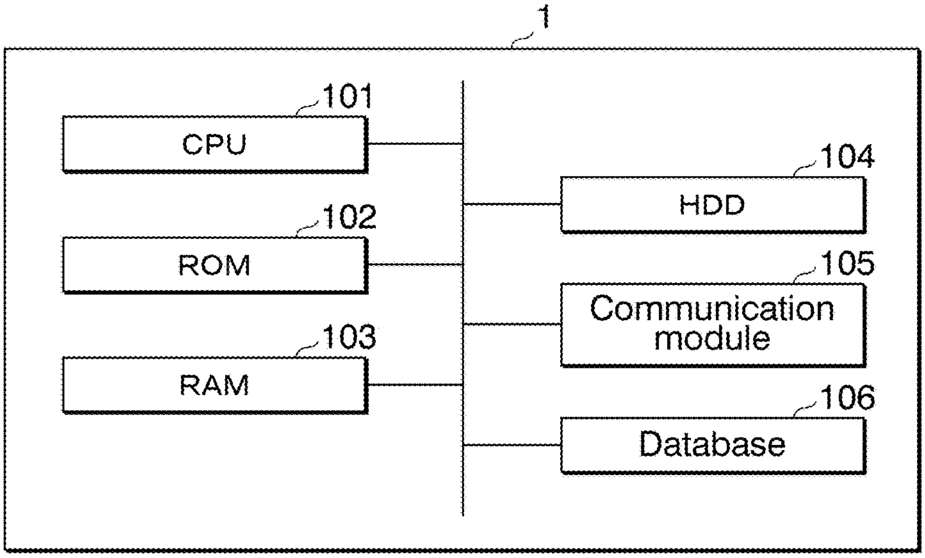
FIG. 2 A hardware configuration diagram of an image processing device according to the present embodiment.

FIG. 2 is a hardware configuration diagram of the image processing device.

As illustrated in this drawing, the image processing device 1 is a computer provided with hardware such as a CPU (Central Processing Unit) 101, a ROM (Read-Only Memory) 102, a RAM (Random Access Memory) 103, an HDD (Hard Disk Drive) 104, a communication module 105, and a database 106.

Figure 3:
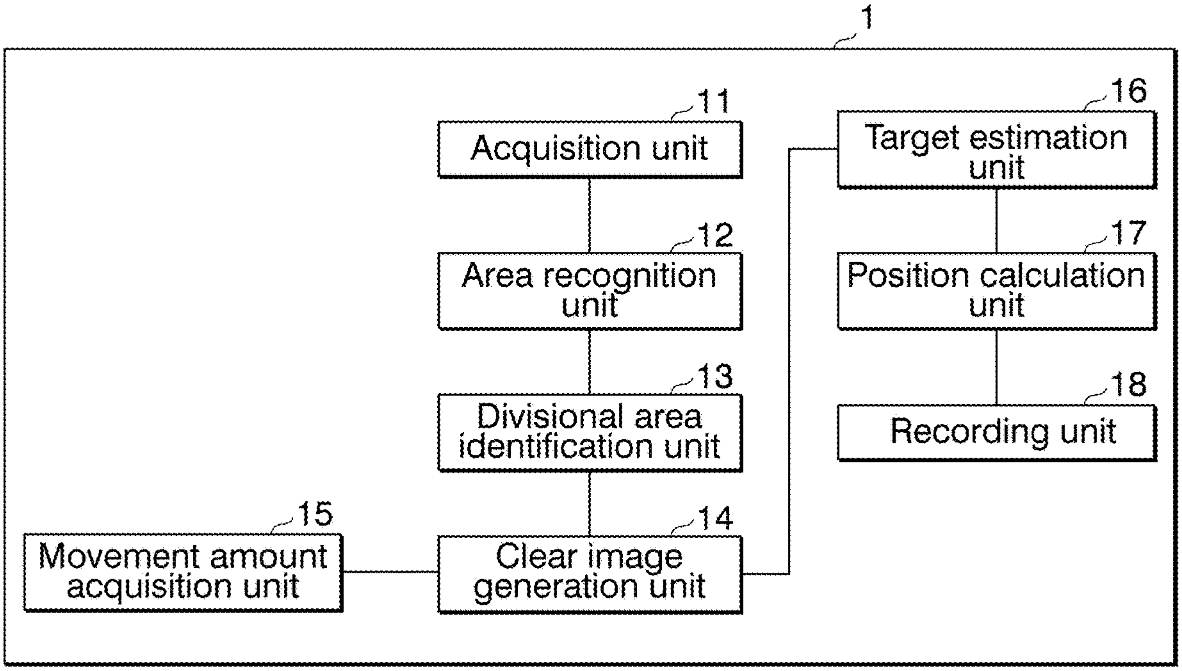
FIG. 3 A functional block diagram of the image processing device according to the present embodiment.

FIG. 3 is a functional block diagram of an image processing device.

The image processing device 1 starts when the power is turned on and executes a pre-stored image processing program. Due to this program, the image processing device 1 performs the functions of an acquisition unit 11, an area recognition unit 12, a divisional area identification unit 13, a clear image generation unit 14, a movement amount acquisition unit 15, a target estimation unit 16, a position calculation unit 17, and a recording unit 18.

The acquisition unit 11 acquires respective captured images generated by repeated image capture by the drive recorder 2 over time.

The area recognition unit 12 calculates, for each pixel in each of said captured images, a probability indicating to which of multiple different area classes, which have been designated regarding multiple targets appearing in the captured images, the pixel belongs.

The divisional area identification unit 13 identifies, among divisional areas obtained by multiply dividing the captured images in a horizontal direction, a divisional area in which the clarity of a prescribed target is high, where the probability of belonging to the area class of the prescribed target is equal to or higher than a threshold value.

The clear image generation unit 14 generates a clear image by combining the divisional areas in which the display clarity regarding the prescribed target in the captured images is high.

The movement amount acquisition unit 15 acquires a movement amount between image capture timings of the respective images.

The target estimation unit 16 estimates an area of the prescribed target in the clear image.

The position calculation unit 17 calculates the positions of moving bodies appearing in the clear image.

The recording unit 18 records processing results such as the clear image.

Figure 4:
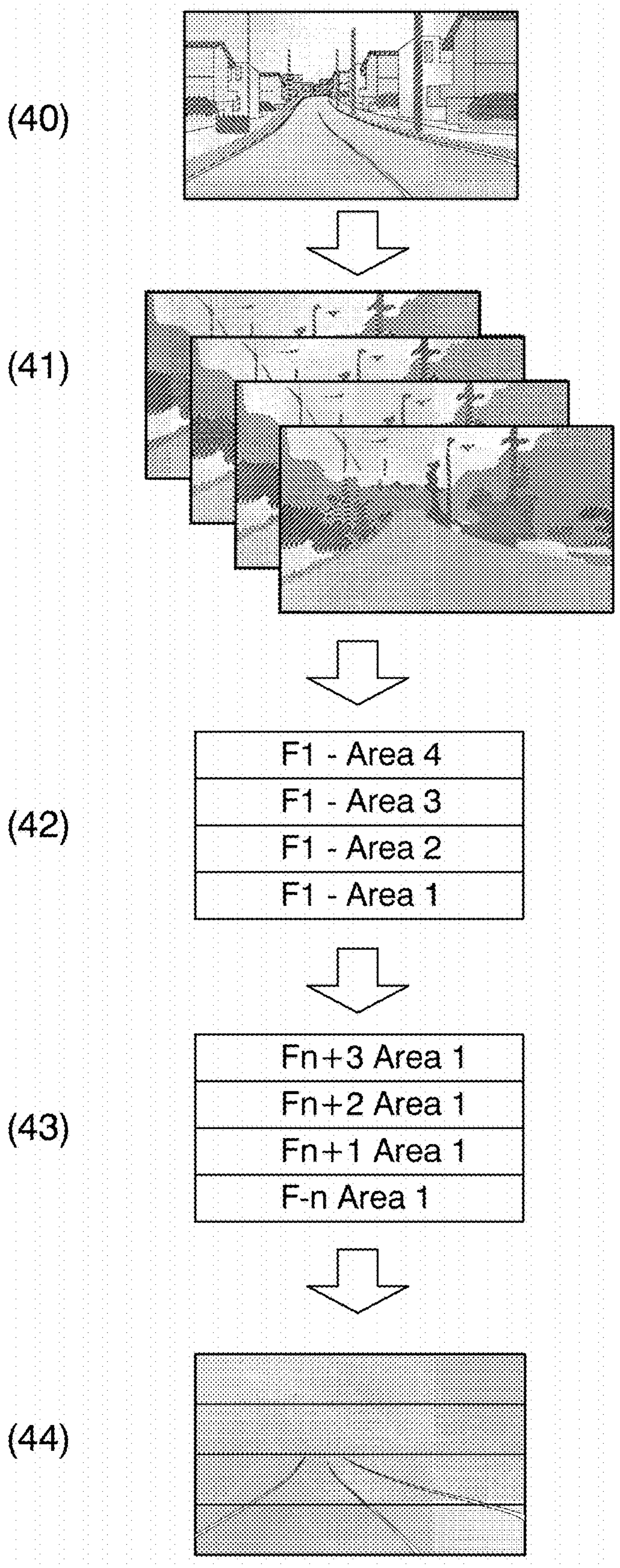
FIG. 4 A first diagram indicating a summary of the processing in the image processing device according to the present embodiment.

FIG. 4 is a first diagram indicating a summary of the processing in the image processing device.

FIG. 4 illustrates a captured image (40), area recognition results (41) using the captured image, captured image division results (42), high-clarity divisional area identification results (43), and clear image generation results (44).

The image processing device 1 acquires respective captured images generated by repeated image capture by the drive recorder 2 over time (40). The image processing device 1 recognizes an area in which each pixel in each of said captured images is included by calculating a probability indicating to which of multiple different area classes, which have been designated regarding multiple targets appearing in the captured images, the pixel belongs (41). The image processing device 1 sets respective divisional areas obtained by multiply dividing the captured images in a horizontal direction (42). The image processing device 1 identifies, from multiple images Fn, divisional areas in which the clarity of a white line is high, where the probability of belonging to the area class of a white line painted on a road which is the prescribed target in the present embodiment, is equal to or higher than a threshold value, among the respective divisional areas (43). The image processing device 1 generates a clear image by combining the divisional areas with high display clarity relating to white lines in the respective captured images (44).

In such a process, the image processing device 1 may generate the clear image by combining the divisional areas in which the display clarity regarding the prescribed target is high among the divisional areas in bird's-eye images generated based on the captured images, and by returning a bird's-eye image generated by the combination to the viewpoint of the camera.

Additionally, the image processing device 1 may acquire the movement amount of the vehicle 20 between image capture timings of the images, and may generate the clear image by combining the divisional areas that have been divided based on the movement amounts.

Additionally, the image processing device 1 may calculate a location in real space corresponding to the location of the moving body in the bird's-eye image, based on the clear image.

FIG. 5 is a diagram indicating the processing flow in the image processing device.

Hereinafter, the processing flow in the image processing device 1 will be explained by following the process in order.

While the vehicle 20 is traveling, the drive recorder 2 outputs, to the image processing device 1, sensing information including captured images generated by image capture. The sensing information may include information such as the image capture times and identifiers for the vehicle 20 or the drive recorder 2. The sensing information may further include location information (latitude, longitude) detected by a GPS function provided in the drive recorder 2, or a speed acquired by the drive recorder 2 from a speed sensor in the vehicle 20. The sensing information may further include information on an identifier of a road on which the vehicle is traveling. The sensing information may also include information such as the speed of the vehicle 20 when each captured image was captured. Objects such as roads, signs, lines and words painted on the roads, buildings, and the sky appear in the captured images. The image processing device 1 sequentially records the acquired sensing information in the database 106. That is, the database 106 records, in a linked manner, the identifier of the vehicle 20 or the drive recorder 2, road identifiers, image capture times, location information, speeds, and captured images.

Under such circumstances, the image processing device 1 acquires a clear image generation instruction on a later date (step S101). The clear image generation instruction may include specifying information for specifying images captured at a prescribed location that is to be processed, such as identifiers of the vehicle 20 or the drive recorder 2, location information, road identifiers, and image capture times. The acquisition unit 11 in the image processing device 1 acquires the generation instruction. The acquisition unit 11 acquires multiple captured images from the database 106 based on the specifying information included in the generation instruction. The multiple captured images are each captured images generated by repeated image capture by the drive recorder 2 over time while the vehicle 20 is traveling. The acquisition unit 11 outputs the multiple captured images that have been acquired to the area recognition unit 12.

The area recognition unit 12 acquires a captured image (40). The area recognition unit 12 recognizes objects appearing in the captured image by area class, such as roads, signs, lines and words painted on roads, buildings, and the sky (step S102). The technology by which the area recognition unit 12 recognizes objects in the captured image by area classes indicating multiple different targets may be a generally known technology. In this process, the area recognition unit 12 calculates the probability that each pixel in the captured image belongs to each area class. The area recognition unit 12 generates, for each pixel in the captured image, area recognition information retaining information regarding the probability of belonging to each area class.

The area recognition unit 12 outputs, to the divisional area identification unit 13, the captured image and area recognition information including information regarding the probability that each pixel belongs to each area class. The divisional area identification unit 13 multiply divides each captured image in the horizontal direction, as explained by (42) in FIG. 4 (step S103). Each area obtained by dividing the captured image will be referred to as a divisional area. The divisional area identification unit 13 identifies the area of a prescribed target in each divisional area in multiple captured images. Specifically, the divisional area identification unit 13 is instructed in advance, by a program, that the prescribed target is a white line painted on a road. The white line may, for example, be a line on the outer side of a vehicular road, a traffic lane boundary line, or a center line. The divisional area identification unit 13 identifies, in each of the divisional areas in the captured image, pixels for which the probability of belonging to the white line class among the area classes is a prescribed threshold value or higher (step S104). The area of the identified pixels is an area, in the captured image, with a high probability of representing a white line, identified based on the probability of belonging to an area class obtained from the area recognition information. The divisional area identification unit 13 identifies, among the divisional areas in the captured image, a divisional area with a large range of pixels for which the probability of being in the white line class is a prescribed threshold value or higher.

The divisional area identification unit 13 may identify one or multiple divisional areas among the divisional areas in the captured image. The divisional area identification unit 13 may not identify any divisional areas in a captured image in the case in which the range of pixels for which the probability of being in the white line class is a prescribed threshold value or higher is determined to be small in all of the divisional areas in the captured image. Regarding the property of having a large range of pixels for which the probability of being in the white line class is a prescribed threshold value or higher, for example, since white lines normally occur as straight lines in captured images, in the case in which the prescribed target is a white line on a road surface of a road, the divisional area identification unit 13 may determine that there is a large range of pixels for which the probability of belonging to the white line class is a prescribed threshold value or higher in the case in which the length of the straight line is a prescribed threshold value or larger. In the case in which the prescribed target is another target, the divisional area identification unit 13 may determine that there is a large range of pixels for which the probability of belonging to the target area class is a prescribed threshold value or higher based on a size or shape in accordance with the target. The divisional area identification unit 13 repeats a similar process for multiple captured images that have been acquired. The divisional areas identified by the divisional area identification unit 13 are image areas in which there is a large range of pixels for which the probability of belonging to the white line class is a prescribed threshold value or higher. Thus, they are image areas in which the white lines that are the targets appear clearly. Upon identifying divisional areas in which white lines clearly appear in each captured image, the divisional area identification unit 13 outputs the captured images and the information regarding the identified divisional areas to the clear image generation unit 14.

In the case in which it is not possible to identify enough divisional areas to be able to generate a clear image, the divisional area identification unit 13 outputs, to the acquisition unit 11, based on the location information included in the clear image generation instruction, instructions to acquire multiple captured images captured at respective locations obtained by slightly shifting said location, in the advancement direction, by a prescribed distance. In this case, the acquisition unit 11 may acquire multiple captured images again based on the new acquisition instructions, and the respective processing units may repeat the processes in a manner similar to the above. In this way, the divisional area identification unit 13 can identify enough divisional areas to be able to generate a clear image by using multiple captured images generated by image capture at slightly different locations. Identifying enough divisional areas to be able to generate a clear image may, for example, in the present embodiment, involve combining divisional areas in which there is a large range of pixels for which the probability of belonging to the white line class is a threshold value or higher in the captured images so as to identify at least enough divisional areas to be able to cover an area identified as being in the road class in the captured images.

The clear image generation unit 14 acquires captured images to which information regarding identified divisional areas has been appended. The clear image generation unit 14, as explained by (43) in FIG. 4, integrates images of the divisional areas identified in the respective captured images (step S104). Then, the clear image generation unit 14 generates a clear image (44) in which a white line clearly appears (step S105).

Figure 6:
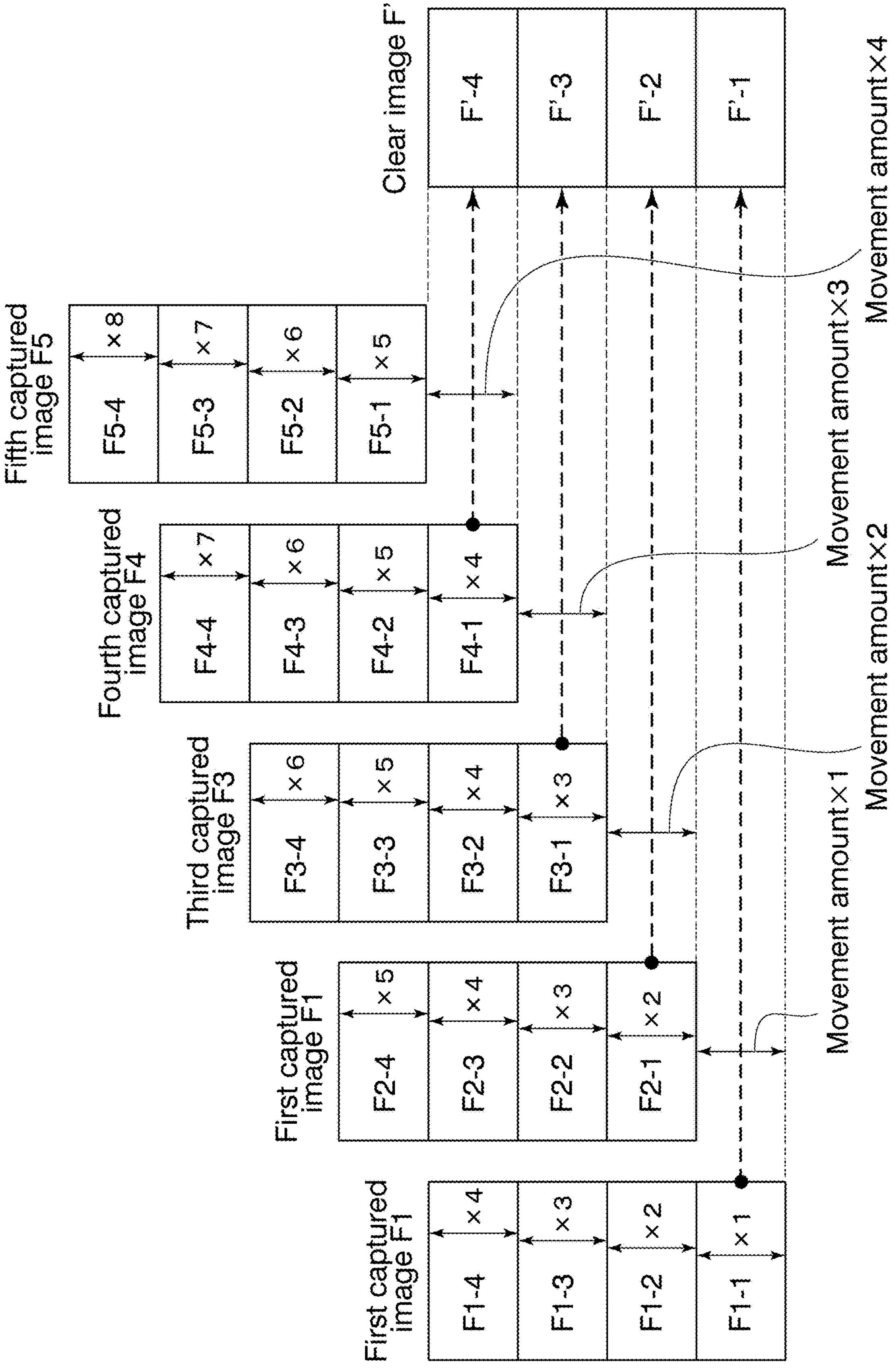
FIG. 6 A second diagram indicating a summary of the processing in the image processing device according to the present embodiment.

FIG. 6 is a second diagram indicating a summary of the processing in the image processing device.

FIG. 6 indicates the details of the processing in the divisional area identification unit 13, the clear image generation unit 14, and the movement amount acquisition unit 15.

FIG. 6 indicates four captured images obtained by converting five images, i.e., a first captured image F1, a second captured image F2, a third captured image F3, a fourth captured image F4, and a fifth captured image F5. These captured images may be obtained by converting captured images acquired from an image capture device to bird's-eye images. The bird's-eye images are images for the case in which the image capture viewpoint of captured images generated by the image capture device have been converted to images from viewpoints looking directly downward at the ground from the sky, the image conversion being performed by a known technology. Hereinafter, the disclosure will be explained under the assumption that the captured images are bird's-eye images. The movement amount acquisition unit 15 calculates a movement amount x1 by which the vehicle 20 moved from the image capture time of the first captured image to the image capture time of the second captured image. Similarly, the movement amount acquisition unit 15 calculates a movement amount x2 by which the vehicle 20 moved from the image capture time of the second captured image to the image capture time of the third captured image, and a movement amount x3 by which the vehicle 20 moved from the image capture time of the third captured image to the image capture time of the fourth captured image. It also calculates a movement amount x4 by which the vehicle 20 moved from the image capture time of the fourth captured image to the image capture time of the fifth captured image.

The movement amounts x1, x2, x3, and x4 will be referred to collectively as movement amounts x. The movement amount acquisition unit 15 may calculate the movement amounts x by which the vehicle 20 moved between the image capture times of two captured images that were captured consecutively based on the image capture times of those two captured images. Alternatively, for example, the movement amount acquisition unit 15 may calculate, using known technology such as optical flow, the movement amounts x of the vehicle 20 as the movement amounts of stationary objects between captured images generated by being captured chronologically earlier and later. Additionally, the movement amount acquisition unit 15 may calculate the movement amount x by which the vehicle 20 moved in an image capture interval between two captured images based on the image capture interval (time) that can be calculated from the image capture times of the respective captured images and the average speed of the vehicle 20 when said captured images were captured, included with the captured images. The movement amount acquisition unit 15 may calculate the movement amount x by which the vehicle 20 moved in an image capture interval between two captured images by the differences between the image capture location information of the two captured images. The movement amount acquisition unit 15 outputs the calculated movement amounts x1, x2, x3, and x4 to the divisional area identification unit 13.

When dividing the first captured image, the divisional area identification unit 13 determines the vertical width of the captured image based on the ratios between the distances of the movement amounts x1, x2, x3, and x4, and divides a bird's-eye view of the first captured image F1 into four areas in parallel in accordance with the width. In this case, if the speed of the vehicle 20 is constant, then the movement amounts x1 to x4 are the same, and the vertical width of the first captured image F1 is divided evenly and in parallel into four areas. The respective divisional areas obtained by dividing the bird's-eye view of the first captured image F1 into four areas will be referred to as F1-1, F1-2, F1-3, and F1-4. Similarly, the divisional area identification unit 13 divides a bird's-eye view of the second captured image F2 into the divisional areas F2-1, F2-2, F2-3, and F2-4. Additionally, the divisional area identification unit 13 divides a bird's-eye view of the third captured image F3 into the divisional areas F3-1, F3-2, F3-3, and F3-4, divides a bird's-eye view of the third captured image F3 into the divisional areas F3-1, F3-2, F3-3, and F3-4, and divides a bird's-eye view of the fourth captured image F4 into the divisional areas F4-1, F4-2, F4-3, and F4-4. The divisional areas F3-3 and F4-2 are identified by using the movement amount x5 by which the vehicle 20 moved during the image capture interval between the fifth captured image F5 and a sixth captured image F6, which is not illustrated, the divisional areas F3-4 and F4-3 are identified by using the movement amount x6 by which the vehicle 20 moved during the image capture interval between the sixth captured image F6, which is not illustrated, and a seventh captured image F7, which is not illustrated, and the divisional area F4-4 is identified by using the movement amount x7 by which the vehicle 20 moved during the image capture interval between the seventh captured image F7, which is not illustrated, and an eighth captured image F8, which is not illustrated. In the example mentioned above, the case of division into four areas was explained as an example. However, the number of divisions may be changed, as appropriate, in accordance with the camera image capture interval (frame rate) and the movement speed. For example, the divisional area identification unit 13 may input the frame rate or the movement speed of the vehicle 20 into a division number calculation formula, and may divide each of the captured images based on the number of divisions obtained as a result. This process is one embodiment of a process by which the divisional area identification unit 13 identifies divisional areas obtained by dividing captured images based on the frame rate of captured images or the speed of the vehicle 20.

The divisional area identification unit 13, by means of the above-mentioned process, identifies a divisional area in which a white line clearly appears among the divisional areas F1-1, F1-2, F1-3, and F1-4 set in the first captured image F1. The divisional area identification unit 13, by means of the above-mentioned process, identifies a divisional area in which a white line clearly appears among the divisional areas F2-1, F2-2, F2-3, and F2-4 set in the second captured image F2. The divisional area identification unit 13, by means of the above-mentioned process, identifies a divisional area in which a white line clearly appears among the divisional areas F3-1, F3-2, F3-3, and F3-4 set in the third captured image F3. The divisional area identification unit 13, by means of the above-mentioned process, identifies a divisional area in which a white line clearly appears among the divisional areas F4-1, F4-2, F4-3, and F4-4 set in the fourth captured image F4.

In this case, the divisional area identification unit 13 identifies the divisional area F1-1 in the first captured image F1, the divisional area F2-1 in the second captured image F2, the divisional area F3-1 in the third captured image F3, and the divisional area F4-1 in the fourth captured image F4 as the divisional areas in which white line clearly appears. In this case, the clear image generation unit 14 generates a clear image F by joining the divisional area F1-1, the divisional area F2-1, the divisional area F3-1, and the divisional area F4-1 in the vertical direction. The clear image generation unit 14 generates a clear image by converting the viewpoint of the clear image F, which is a bird's-eye image, to the viewpoint of the camera provided on the drive recorder 2. As the viewpoint conversion technology, a known technology may be used.

In the example described above, bird's-eye images of the captured images are generated, and the bird's-eye images are used to set divisional areas and to identify divisional areas in which a white line clearly appears. However, the image processing device 1 may similarly set the divisional areas using the captured images as they are and may identify the divisional areas in which a white line clearly appears without generating bird's-eye images.

In the process described above, the image processing device 1 uses information regarding divisional areas identified respectively in the first captured image F1 to the fourth captured image F4 in order to generate a clear image F. However, the clear image F may be generated by using divisional areas in captured images generated by image capture before the first captured image F1 or in captured images generated by image capture after the fourth captured image F4.

The clear image generation unit 14 outputs the generated clear image to the target estimation unit 16. Although the area recognition information regarding the respective divisional areas contained in the clear image includes probability information regarding each area class for each pixel in the clear image, the target estimation unit 16 may generate the area recognition information for the clear image by recalculating the probability, by area class, for each pixel in the clear image. Furthermore, the target estimation unit 16 generates a clear image emphasizing the color of an image of a white line area including a range of pixels for which the probability of belonging in the white line area class is a threshold value or higher. The target estimation unit 16 outputs the clear image to the recording unit 18. The recording unit 18 records the clear image in the database 106. As a result thereof, a clear image in which the white line clearly appears can be generated. The target estimation unit 16 outputs the clear image to the position calculation unit 17.

The position calculation unit 17 calculates the distance between the white line and other vehicles appearing in the clear image. For example, the position calculation unit 17 determines whether a vehicle appears in the clear image. The position calculation unit 17 may input the clear image to a vehicle determination model generated by machine learning of vehicles, and may determine whether a vehicle appears in the clear image based on the results thereof. Additionally, the position calculation unit 17 may determine that a vehicle appears in the clear image when there is a range in which the probability of belonging to the vehicle area class is high as information regarding area classes in the clear image. The position calculation unit 17 identifies the range of a vehicle in the clear image based on a range of pixels in which the probability of belonging to the vehicle area class is high. Alternatively, the position calculation unit 17 may identify the range of a vehicle in the clear image by means of pattern matching. The position calculation unit 17 calculates the distance between the white line and the vehicle based on the number of pixels between the white line and the range of the vehicle in the clear image. The recording unit 18 records, in the database 106, the clear image linked with information regarding the distance between the white line and the vehicle appearing in said clear image.

According to the processes above, a clear image in which a white line, which is the prescribed target, clearly appears can be generated on the basis of the captured image generated by image capture by the drive recorder 2 on the vehicle 20.

According to the processes above, an example of the case in which the prescribed target is a white line was explained. However, the prescribed target may be another road-associated object, such as a sign on the road or a guardrail.

In the processes above, a process in which the image processing device 1 generates a clear image was explained. However, the clear image may be generated from captured images in a manner similar to that of the image processing device 1 described above by the drive recorder 2 or another vehicle-mounted device provided on the vehicle 20.

Figure 7:
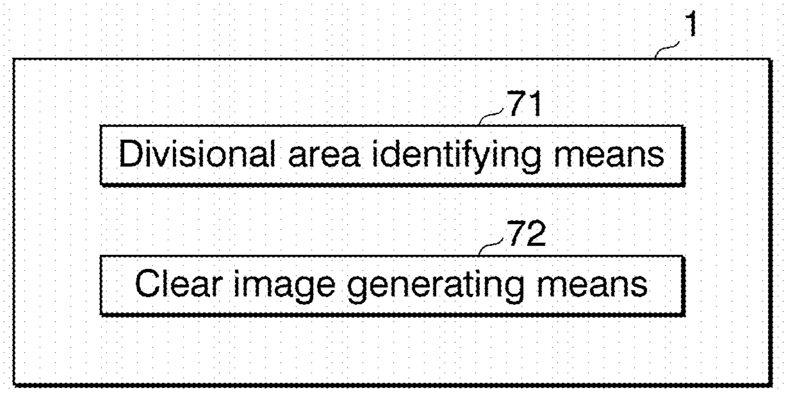
FIG. 7 A diagram illustrating the minimum configuration of the image processing device according to the present embodiment.

FIG. 7 is a diagram illustrating the minimum configuration of the image processing device.

Figure 8:
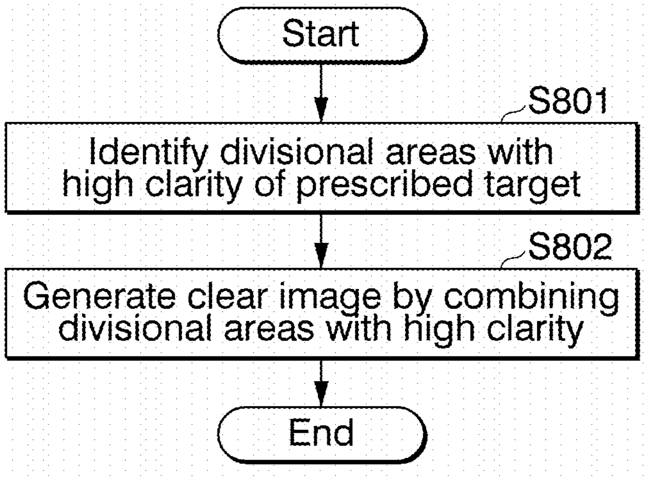
FIG. 8 A diagram indicating the processing flow in the image processing device with the minimum configuration according to the present embodiment.

FIG. 8 is a diagram indicating the processing flow in the image processing device with the minimum configuration.

The image processing device 1 may be provided with at least a divisional area identifying means 71 and a clear image generating means 72.

The divisional area identifying means 71 identifies, among divisional areas obtained by multiply dividing captured images in a horizontal direction, a divisional area in which the clarity of a prescribed target among multiple targets is high, where the probability of belonging to the area class of the prescribed target is equal to or higher than a threshold value (step S801).

The clear image generating means 72 generates a clear image by combining the divisional areas in which the display clarity regarding the prescribed target in the respective captured images is high (step S802).

The respective devices mentioned above have internal computer systems. Furthermore, the steps in the respective processes mentioned above are stored, in the form of a program, in a computer-readable recording medium, and the above-mentioned processes are performed by a computer reading and executing this program. In this case, a computer-readable recording medium refers to a magnetic disk, a magneto-optic disk, a CD-ROM, a DVD-ROM, a semiconductor memory, or the like. Additionally, this computer program may be transmitted to a computer by means of a communication line, and the computer that has received this transmission may execute said program.

Additionally, the above-mentioned program may be for realizing just some of the aforementioned functions. Furthermore, it may be a so-called difference file (difference program) that can realize the aforementioned functions by being combined with a program already recorded in a computer system.

REFERENCE SIGNS LIST

- 1 Image processing device
- 2 Drive recorder
- 11 Acquisition unit
- 12 Area recognition unit (area recognizing means)
- 13 Divisional area identification unit (divisional area identifying means)
- 14 Clear image generation unit (clear image generating means)
- 15 Movement amount acquisition unit (movement amount acquiring means)
- 16 Target estimation unit
- 17 Position calculation unit (position calculating means)
- 18 Recording unit

The invention claimed is:

1. An image processing device comprising:

at least one memory configured to store instructions; and at least one processor configured to execute the instructions to:

acquire a plurality of captured images generated by repeated image capture over time by an image capture device provided on a moving body, and calculating, for each pixel in each of the plurality of captured images, a probability that the pixel belongs to each of multiple different area classes indicating multiple targets appearing in the plurality of captured images;

divide each of the plurality of captured images into divisional areas in a horizontal direction;

identify, among the divisional areas of each of the plurality of captured images, divisional areas, based on a range of pixels, in which the probability of belonging to an area class indicating a prescribed target among the multiple targets is equal to or higher than a threshold value; and generate a clear image regarding the prescribed target by combining the identified divisional areas in the plurality of captured images.

2. The image processing device according to claim 1, wherein the at least one processor is configured to execute the instructions to:

generate the clear image by combining the identified divisional areas regarding the prescribed target among the divisional areas in bird's-eye images generated based on the plurality of captured images, and by returning a bird's-eye image generated by the combination to a viewpoint of the image capture device.

3. The image processing device according to claim 1, wherein the at least one processor is further configured to execute the instructions to acquire movement amounts of the moving body between image capture timings of the plurality of captured images, and the at least one processor is configured to execute the instructions to generate the clear image by combining the divisional areas, in which each of the plurality of captured images has been divided according to ratios between the acquired movement amounts.

4. The image processing device according to claim 1, wherein the at least one processor is further configured to execute the instructions to calculate positions of moving bodies appearing in the clear image.

5. The image processing device according to claim 1, wherein:

the moving body is a vehicle;

the plurality of captured images are images capturing, in a direction of advancement, a road on which the vehicle is traveling; and the prescribed target is a line painted on a road surface of the road.

6. The image processing device according to claim 1, wherein the at least one processor is configured to execute the instructions to:

acquire a number of divisions based on a frame rate of the plurality of captured images or a speed of the moving body, and identify the divisional areas obtained by dividing each of the plurality of captured images according to the acquired number of divisions.

7. An image processing method that comprises:

acquiring a plurality of captured images generated by repeated image capture over time by an image capture device provided on a moving body, and calculating, for each pixel in each of the plurality of captured images, a probability that the pixel belongs to each of multiple different area classes indicating multiple targets appearing in the plurality of captured images;

dividing each of the plurality of captured images into divisional areas in a horizontal direction:

identifying, among the divisional areas of each of the plurality of captured images, divisional areas, based on a range of pixels, in which the probability of belonging to an area class indicating a prescribed target among the multiple targets is equal to or higher than a threshold value; and generating a clear image regarding the prescribed target by combining the identified divisional areas in the plurality of captured images.

8. A non-transitory computer-readable storage medium storing program that makes a computer in an image processing device to execute processes, the processes comprising:

acquiring a plurality of captured images generated by repeated image capture over time by an image capture device provided on a moving body, and calculating, for each pixel in each of the plurality of captured images, a probability that the pixel belongs to each of multiple different area classes indicating multiple targets appearing in the plurality of captured images;

dividing each of the plurality of captured images into divisional areas in a horizontal direction;

identifying, among the divisional areas of each of the plurality of captured images, divisional areas based on a range of pixels in which a probability of belonging to an area class indicating a prescribed target among the multiple targets is equal to or higher than a threshold value; and generating a clear image regarding the prescribed target by combining the identified divisional areas in the plurality of captured images.

9. The image processing device according to claim 1, wherein in a case where a predetermined amount of the divisional areas cannot be identified, acquiring, dividing and identifying are performed based on the plurality of captured images captured at respective locations obtained by slightly shifting a location in a direction of advancement of the moving body by a predetermined distance.

10. The image processing device according to claim 1, wherein the at least one processor is configured to execute the instructions to:

acquire the plurality of captured images by repeatedly capturing an image in a direction of advancement over time by the image capture device provided on the moving body that is traveling.

11. The image processing device according to claim 1, wherein the at least one processor is configured to execute the instructions to:

identify the divisional areas based on a size or shape of the range of pixels in which the probability of belonging to the area class indicating the prescribed target is equal to or higher than the threshold value.

12. The image processing device according to claim 1, wherein the at least one processor is configured to execute the instructions to:

generate the clear image by combining the identified divisional areas, divided in the horizontal direction, in a vertical direction.

13. The image processing device according to claim 1, wherein the plurality of captured images are divided only in the horizontal direction.

14. The image processing device according to claim 13, wherein the at least one processor is configured to execute the instructions to:

acquire the plurality of captured images by repeatedly capturing an image in a direction of advancement over time by the image capture device provided on the moving body that is traveling, and wherein the horizontal direction is perpendicular to the direction of advancement.

* * * * *